US012574362B2

(12) United States Patent
Nimbavikar

(10) Patent No.: US 12,574,362 B2
(45) Date of Patent: Mar. 10, 2026

(54) NETWORK CONNECTIVITY BASED ON USER IDENTITY

(71) Applicant: T-Mobile USA, Inc., Bellevue, WA (US)

(72) Inventor: Gunjan Nimbavikar, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 628 days.

(21) Appl. No.: 17/950,918

(22) Filed: Sep. 22, 2022

(65) Prior Publication Data

US 2024/0106818 A1 Mar. 28, 2024

(51) Int. Cl.
*H04L 9/40* (2022.01)
*G06Q 30/04* (2012.01)

(52) U.S. Cl.
CPC .......... *H04L 63/083* (2013.01); *G06Q 30/04* (2013.01); *H04L 63/0861* (2013.01)

(58) Field of Classification Search
CPC .... H04L 63/083; H04L 63/0861; G06Q 30/04
See application file for complete search history.

(56) References Cited

U.S. PATENT DOCUMENTS

| | | | | |
|---|---|---|---|---|
| 10,194,313 | B1 * | 1/2019 | Karimli | H04W 8/205 |
| 10,356,096 | B2 * | 7/2019 | Serban | H04L 63/0853 |
| 10,715,996 | B1 * | 7/2020 | Singh | G06Q 20/0855 |
| 12,015,918 | B2 * | 6/2024 | Manepalli | H04L 63/0838 |
| 2017/0094508 | A1 * | 3/2017 | Felt | H04L 67/141 |
| 2020/0167862 | A1 * | 5/2020 | Manepalli | H04L 63/083 |
| 2023/0073252 | A1 * | 3/2023 | Chaugule | H04W 60/04 |

* cited by examiner

*Primary Examiner* — Kambiz Zand
(74) *Attorney, Agent, or Firm* — Lee & Hayes, P.C.

(57) ABSTRACT

Techniques for managing a service plan by a telecommunication network provider are described herein. The telecommunication network provider can implement a billing system to establish, update, or otherwise determine a service plan that is based on a user identity rather than a specific device identifier. The service plan can include a billing rate for multiple devices to connect to a telecommunications network without requiring that the service plan identify device information for each of the multiple devices. The billing system can receive user information from a device, authenticate a user identity, and analyze data in a service plan to determine whether to generate a connection credential for connecting the device to the telecommunications network.

18 Claims, 6 Drawing Sheets

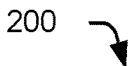
200
Network Functions
(NFs)
202
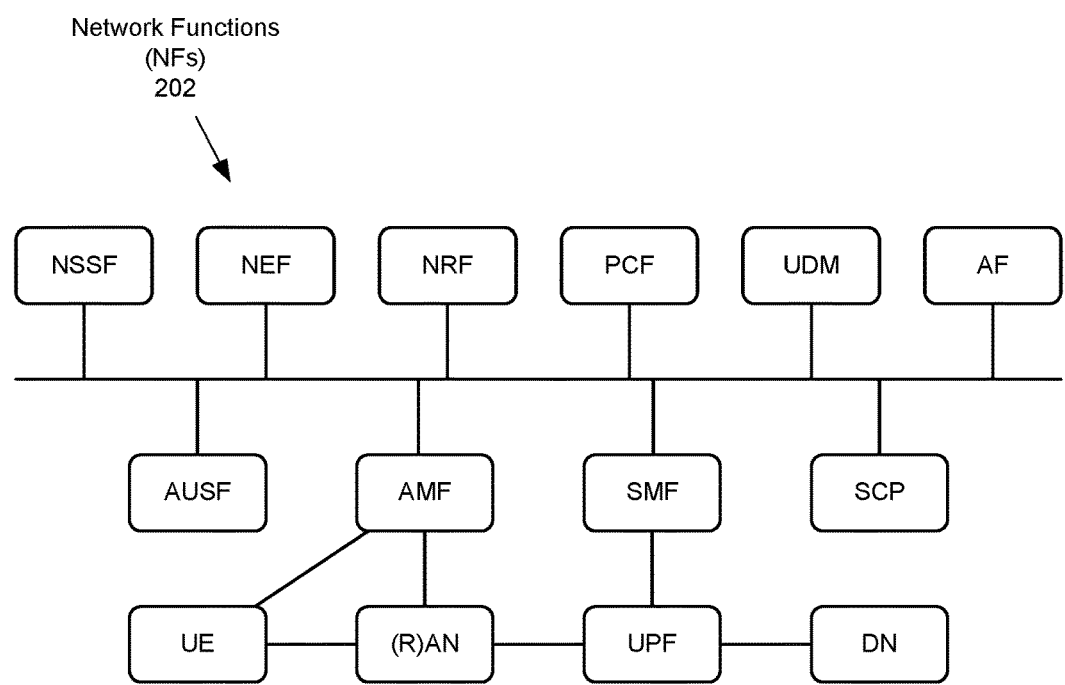
FIG. 2

400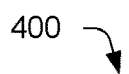

Receive, by the service plan component, a first communication from a first device at a first time, the first communication including first biometric data or first user credentials associated with a user of the first device
402

Determine, by the service plan component and based at least in part on the first communication, a service plan for the user to access the telecommunications network using the first device or a second device different from the first device, the service plan not including a device identifier for the second device
404

Store, by the service plan component, one or more values to represent the service plan in a memory or database;
406

Receive, by the service plan component and from the second device at a second time after the first time, a second communication requesting access to the telecommunications network, the second communication including second biometric data or second user credentials associated with the user of the second device
408

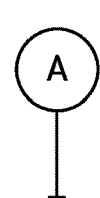

Access, by the service plan component and based at least in part on the second communication, the service plan from the memory or the database
410

Determine, by the activation component and based at least in part on the service plan not including the device identifier for the second device, a device credential for the second device to establish a communication channel using the telecommunications network
412

Transmit, by the activation component, the device credential to the second device to establish the communication channel
414

FIG. 4B

NETWORK CONNECTIVITY BASED ON USER IDENTITY

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 depicts an example system architecture for a fifth generation (5G) telecommunication network.

FIG. 4A is a first part of a flowchart depicting an example process for determining service plan information by an example billing system usable to connect a device to an example network.

FIG. 4B is a second part of the flowchart depicting the example process for determining service plan information by an example billing system usable to connect a device to an example network.

DETAILED DESCRIPTION

Figure 1:
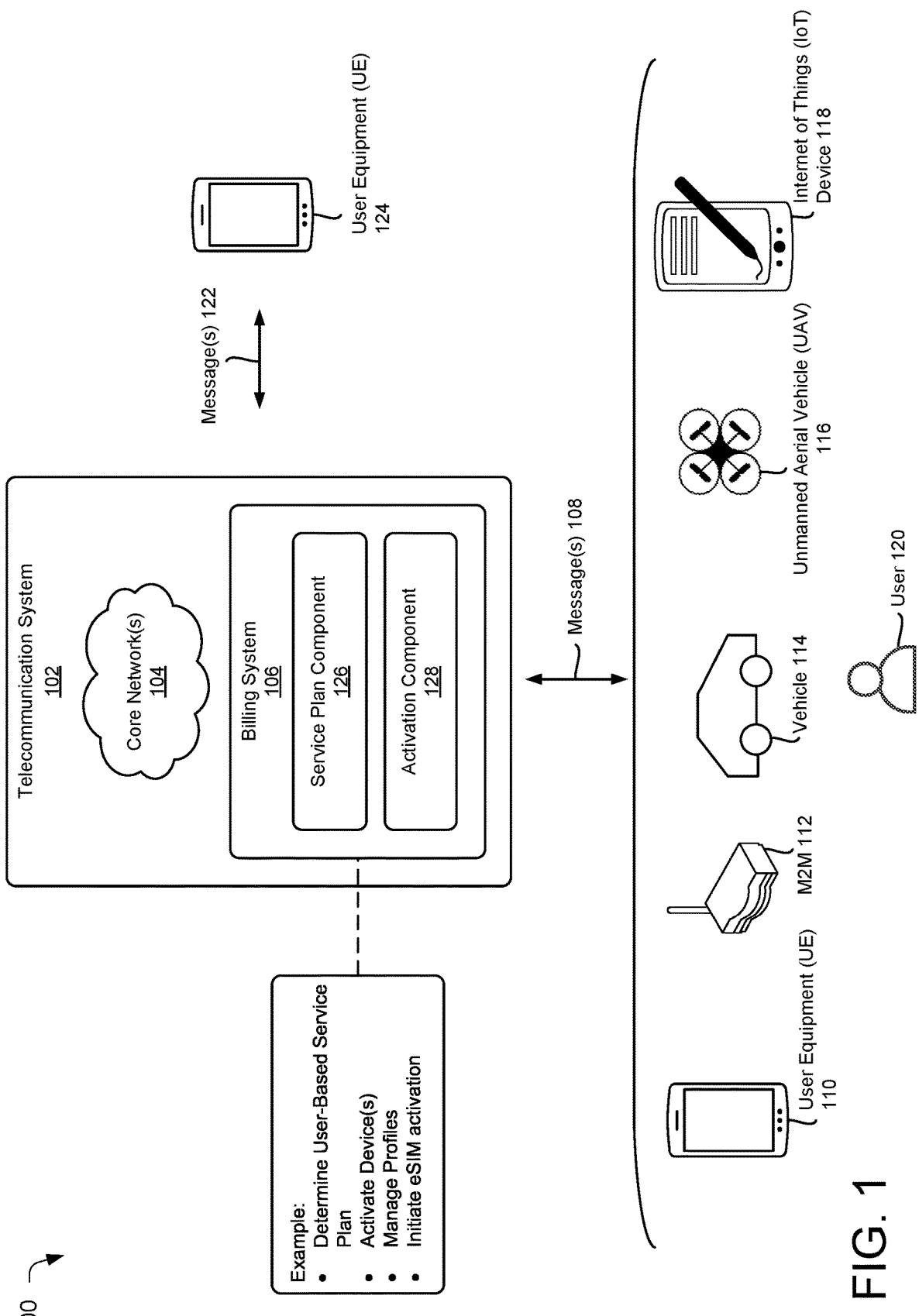
FIG. 1 depicts an example network environment in which an example telecommunication system implements an example billing system to manage multiple devices associated with a user.

This application describes techniques for a billing system of a telecommunication provider to determine a service plan that enables a variety of devices associated with a user access to a telecommunications network. For example, the techniques can include the billing system establishing, updating, or otherwise determining a service plan that is based on a user identity rather than a device type (e.g., mobile phone, smartwatch, tablet, etc.) or particular device identifier of a device. For example, user information (e.g., biometric information, user credentials, etc.) can be associated with the service plan and an additional device associated with the user can connect to the telecommunications network at a later time based at least in part on the user information in the service plan. By determining the service plan that associates the user with a variety of devices as described herein, less service plan data is stored and connecting an additional device can be performed using fewer data exchanges over the telecommunication network versus existing techniques that determine a service plan for each individual device.

The techniques described herein use fewer data exchanges to connect a device to a telecommunications network by relying on a "user-based" service plan having a billing rate for multiple devices to connect to the telecommunications network without requiring that the service plan identify at least some device information at the time of determining the billing rate. Instead, the billing rate can be based at least in part on a user input specifying how many devices associated with a same user identity may request a communication channel with the telecommunications network in the future. The service plan can associate, as a plan identifier, user-provided information such as a user identifier and password, biometric information, etc. with information indicating a number of different devices associated with the user. In some examples, the user can interact with a new device causing user information to be sent from the device to a billing system that identifies the plan identifier using the user information, and compares the user information from the device to the user-provided information in the service plan. In some examples, the billing system can determine that the user can add the new device to the service plan without being over the number of devices indicated by the service plan.

Generally, the techniques described herein can include a server of a network provider exchanging data with a device to manage service plans that provide the user flexibility to access one or more networks using up to a threshold number of devices. For instance, the server can determine a billing rate for a service plan that enables additional devices to be identified at a later time (e.g., the billing rate does not necessarily depend on specific characteristics about the additional devices) without changing the billing rate or requiring the user to enter device information associated with the additional devices. Instead, the server can determine a billing rate for a service plan that includes connecting up to a threshold number of devices independent of identifying each device at the time of determining the billing rate thereby giving the user the flexibility to onboard devices to the one or more networks using a same service plan that "tracks" a user of different devices.

In some examples, the user can enter user information into a device requesting access to a network, and the device can send the user information to the server to authenticate an identity of the user and/or to verify that the threshold number of devices associated with the service plan has not been met. In such examples, the server can associate the device as one of the threshold number of devices, determine a device specific subscription in the service plan, and generate connection data for sending to the device to cause the device to establish a communication channel over the network. In this way, the device can be associated with a service plan for billing purposes based on the user information and without requiring subsequent user inputs to change the service plan (e.g., the service plan can be accessed by the server automatically based on receiving user information from the device to activate another device).

Some current service plans can have a billing rate based on a device type, such as whether a device for connecting to a network is a smartphone, tablet, or other device type. Further, some current service plans determine a billing rate based on device information (e.g., a device identify, phone number, device type, etc.) for each device in the service plan prior to determining the billing rate. By using the techniques described herein, an additional device(s) can be connected to a network based at least in part on the service plan indicating that the threshold number of devices has not been met. By way of example and not limitation, a user can activate a smart phone or laptop computer and provide data such as a fingerprint, iris information, or other information as part of onboarding onto a telecommunications network. The server can receive the data and compare at least some of the data from the smart phone (e.g., biometric data) to data in the service plan to determine that the user is able to use multiple devices to access the network. The server can, based on the comparison, generate data for sending to the smartphone that causes the smartphone to initiate a connection to the network.

In various examples, the server of the network provider can receive user data associated with a request to establish a service plan for multiple devices associated with a user. The user data can include biometric information (e.g., information related to human characteristics of the user) and/or a user identifier and a password associated with a service plan. The server can, for instance, determine a service plan representing an agreement between the user and the network provider for the user to connect the multiple devices to a network(s) independent of identifying a model or device type of each of the multiple devices. Thus, at least one of the multiple devices can remain unknown to the extent that a device identifier (or other identifier that uniquely identifies a device) is omitted from the service plan. In various examples, the model or the device type of each the devices does not contribute to a billing rate associated with the service plan as the billing rate is determined prior to at least some of the multiple devices initially connecting to the network. For instance, a user can purchase a device at a time after determining the service plan, and "onboard" the device onto a network of the network provider by entering user information into the device which can be automatically sent to the server to implement some of the techniques described herein.

Data associated with the user, the service plan, and/or one or more the devices can be stored in a memory or database associated with the billing system. In some examples, the memory or database can store identity information (e.g., user credentials, iris information, fingerprint information, body scan data associated with estimating a portion of the body of the user, etc.) which is usable to verify an identity of a user accessing a network using different devices under a same user account. When the user interacts with another device (e.g., a computing device, a smartphone, and the like) in the future, the device can receive biometric information from the user, and sends the biometric information to the billing system (at times automatically and without explicit input from the user) for comparing with the stored identity information. Additionally, or alternatively, the user can interact with the device via an application output for display on the device and/or an application output on a display remote from the device (e.g., when the user is an administrator of a Machine to Machine device (M2M), an operator or passenger of a vehicle, an operator of unmanned aerial vehicle (UAV)). Based on the stored identity information of the service plan being substantially similar to the biometric information associated with the device, the billing system can generate data usable by the device for connecting to the network without requiring the user to explicitly purchase a billing plan for the device or provide a list of devices to be associated with the service plan beforehand. Thus, a user can interact with various devices over the network at a billing rate that is based on an identity of the user.

In some examples, the techniques can include a telecommunication network provider implementing one or more computing devices to determine a billing rate for a service plan that enables multiple device to connect to a telecommunication network based on user information without requiring specific device information for all the multiple devices. The one or more computing devices (e.g., a server, a billing system) can also communicate with one or more different entities (e.g., a device having an eSIM, a third party vendor, a business entity of the telecommunication network provider, etc.) to determine data associated with a user, a billing rate, and/or a service plan. In various examples, the computing device(s) can initiate activation or configuration of an embedded Subscriber Identity Module (eSIM). Implementing the one or more computing devices enables the telecommunication network provider to assign an eSIM to a service plan to initiate billing for a device. Using the techniques described herein, the telecommunication network provider can cause an eSIM to activate based at least in part on user information associated with the service plan (e.g., the user information can be compared to data associated with the service plan, and eSIM activation can be initiated without the user providing explicit instructions to activate the eSIM). In some examples, the eSIM can be associated with a user equipment, a computing device, an Internet of Things device, a watch device, a meter (e.g., a smart utility meter, etc.), a listening device, a video camera device, a vehicle, a drone, a bicycle, a sensor, or a Machine to Machine device, just to name a few.

In some examples, a server associated with a telecommunications provider can include functionality to identify that a user is associated with a service plan that enables the user to connect different devices, including a device that is not currently identified in the service plan (e.g., the service plan is independent of the device). For example, user information uniquely identifying the user can be received in association with a communication from a device, and the server can authenticate an identity of the user. Based on the identity of the user being authenticated, information about the service plan can be accessed to determine whether to add the device to an existing service plan, or to establish a new service plan. Additional details of the user-based connection techniques employed by the server can be found throughout this disclosure including in the figures that follow.

The systems and techniques disclosed herein can manage a service plan and device connections associated therewith by employing a server, computing device(s), and/or a databases(s), etc. that collectively receive user information, determine an allowable number of connectable devices, generate a service plan that enables multiple devices permission to connect to a telecommunications network, and/or generate data for sending to one of the multiple devices that causes the device to connect to the telecommunication network. The server may, for example, access a service plan to validate an identity of a user, or identify details about the service plan including whether more devices can be added to the service plan using a same billing rate. In some examples, the server can receive an order from a user to establish a service plan, or a request to add a device to the service plan. The server may also determine a security protocol and/or a security key for exchanging data with one or more devices (or portions thereof such as an eSIM embedded in a device). In this way, the telecommunications network provider can securely exchange data usable to connect devices in accordance with the service plan of the telecommunications network provider. By using the systems and techniques disclosed herein, an eSIM of a device can be assigned to a service plan based on biometric data or user credentials thereby enabling the device to function with the eSIM.

In various examples, a device as described herein can include one of: a user equipment (e.g., smart phone, a computing device, etc.), a Machine to Machine device an Internet of Things device, a watch device, a meter (e.g., a smart utility meter, etc.), a listening device, a video camera device, a sensor associated with a vehicle, a drone, a bicycle, and the like, etc.)

FIG. 1 depicts an example network environment 100 in which an example telecommunication system implements an example billing system to manage multiple devices associated with a user. For example, a telecommunication system 102 can include one or more core network(s) 104 for a billing system 106 to exchange one or more messages 108 with one or more of: a user equipment (UE) 110, a Machine to Machine device (M2M) 112, a vehicle 114, an unmanned aerial vehicle (UAV) 116, or an Internet of Things (IoT) device 118 associated with a user 120. Using the techniques described herein, the billing system 106 can exchange the message(s) 108 to establish, access, modify, or otherwise determine a service plan associated with a user that enables any one of the devices associated with the user 120 to establish a communication session with another device over the one or more core networks 104, including a device that may not have a device identifier associated with the service plan. For example, the billing system 106 can analyze information in the service plan (e.g., validate an identity of the user, identify an allowable number of devices in the service plan, etc.) to generate a device credential usable for the UE 110 (or other device) to exchange one or more messages 122 with UE 124.

In various examples, the telecommunication system 102 can represent functionality to provide communication (e.g., an exchange of data) between the UE 110, the billing system 106, and/or the UE 124 and can include one or more radio access networks (RANs), as well as one or more core networks linked to the RANs. For instance, the eSIM can wirelessly connect to a base station or other access point of a RAN, and in turn be connected to the core network(s) 104. The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi® technology, and/or any other previous or future generation of radio access technology. In this way, the telecommunication system 102 is compatible to operate with other radio technologies including those of other service providers. Accordingly, a message from the UE 110 may be processed by telecommunication system 102 independent of the technology used by the UE 110.

In some examples, the core network(s) 104 can represent a service-based architecture that includes multiple types of network functions that process control plane data and/or user plane data to implement eSIM services for the device associated with the eSIM. In some examples, the services comprise the message(s) 108 and/or the message(s) 122 which may include a text, a data file transfer, an image, a video, a combination thereof, and so on. The network functions of the core network(s) 104 can include an Access and Mobility Management Function (AMF), a Session Management Function (SMF), a User Plane Function (UPF), a Policy Control Function (PCF), and/or other network functions implemented in software and/or hardware, just to name a few. Examples of network functions are also discussed in relation to FIG. 2, and elsewhere.

Generally, the billing system 106 provides functionality to determine a service plan that is based on a user identity rather than a device type (e.g., mobile phone, smartwatch, tablet, etc.) or particular device identifier of a user device. For example, user information (e.g., biometric information, user credentials, etc.) can be associated with the service plan and an additional device associated with the user (e.g., another UE, the vehicle 114, etc.) can connect to the one or more core networks 104 (e.g., a 5G core network, a 4G core network, etc.) based at least in part on the user information associated with the user 120 in the service plan.

As depicted in FIG. 1, the billing system 106 comprises a service plan component 126 and an activation component 128 to implement the techniques described herein. For example, the service plan component 126 can represent functionality to initiate, update, and store service plan data associated with a service plan of the user 120. In some examples, the service plan component 126 can receive the message 108 from another UE of the user 120 after establishing the service plan (e.g., determining a billing rate for multiple devices) and parse user information from the message 108 to access a service plan associated with the user 120. In various examples, the service plan component 126 can authenticate an identity of the user based at least in part on the user information, and identify whether the service plan permits the other UE to use a communication channel for exchanging data with another device (e.g., the UE 124).

The activation component 128 represents functionality to activate a device associated with the user 120 (e.g., determine an initial or new connection to the network). For example, the activation component 128 can receive data from the service plan component 126 indicating that a particular device is permitted to connect to the core network(s) 104, and initiate activating an eSIM for the particular device. In some examples, the activation component 128 can exchange data with one or more other components of the telecommunication system 102 to cause the permitted device to associate the eSIM with a user identifier associated with the user 120 and the service plan. By implementing the techniques described herein, the eSIM for the device can be activated based on the user 120 initially interacting with the device (providing user credentials or biometric data to access the device) which can cause the information to be sent to the billing system 106 independent of the user 120 explicitly initiating the sending). Thus, the device can be activated automatically responsive to the initial user interaction. In some examples, the activation component 128 can initiate eSIM activation including assigning or otherwise associating an identifier of the eSIM (e.g., an International Mobile Equipment Identity (IMEI)) to an identifier of a subscriber (e.g., an International Mobile Subscriber Identity (IMSI)). In various examples, the association between a user and an eSIM, or activation, can occur after verifying a test status or performing a test of various operations performed by the eSIM. Additional details of managing an eSIM are described in U.S. patent application Ser. No. 17/530,344, filed on Nov. 18, 2021, entitled "Enterprise Embedded Subscriber Identity Module Management," which is incorporated herein by reference in its entirety and for all purposes.

In various examples, the billing system 106 can be associated with one or more memories, databases, or another data storage entity for storing service plan data (e.g., user information, billing rate information, eSIM information, etc.). In some examples, the billing system can store data representing a user profile which can include an identity of the user, user preferences, contacts, device information, network provider information, and the like. In some examples, the billing system 106 can be configured to store data such as device data describing the device hosting the eSIM, an eSIM identifier, and user data associated with a user of the device.

In various examples, the billing system 106 can implement functionality to secure data exchanged with various devices before, during, and/or after an operation associated with the service plan and/or the user information (e.g., sending a communication, receiving a communication, etc.). For example, a security component (not shown) can be configured to determine a secure protocol, a security key, or other security information for communicating the message (s) 108 with the UE 110 (or another device). The security component can, for example, validate a security key associated with a communication, test operation, secure a payment, and so on. In various examples, the billing system 106 can implement a payment component (not shown) to receive and process a payment as well as determine a payment status indicating payment or credit associated with a service plan (e.g., for optional output in a user interface).

In various examples, the billing system 106 can determine a protocol (e.g., an API, security protocol, communication protocol, etc.) for communicating the messages(s) 108. In some examples, the messages(s) 108 can include one or more of: a transmission control protocol (TCP), an internet protocol (IP), a user datagram protocol (UDP), a simple mail transport protocol (SMTP), a file transfer protocol (FTP), a hypertext transfer protocol (HTTP), or a hypertext transfer protocol secure (HTTPS). In this way, the billing system 106 can communicate with a variety of device types using a variety of communication types.

In some examples, the billing system 106 can include a user interface component (not shown) representing functionality for the billing system 106 to interface with a user of a device via one or more user interfaces having programmable controls that convey information and may receive input. In some examples, the user interface component can cause data to output on a display device of the UE 110 (or other device type) to enable the billing system 106 to receive user information (or communications associated therewith), payment for an eSIM change request as well as to present a status of an order. The user interface component may also present a user interface for a user to initiate recovery of a deleted or non-functioning eSIM, manage profiles for multiple eSIMs by storing one or more user profiles on an eSIM of the UE 110.

In some examples, the user interface component can be configured to present dashboards or other data to one or more users in one or more business entities of the telecommunication system 102. A member of an engineering team may, for instance, access data associated with a network, a user, a device of the user, and/or a service plan via the dashboards to identify improvements in configuring the billing system 106, a network entity, and/or a service plan. Data presented in association with the user interface component may also or instead provide support for troubleshooting aspects related to connecting multiple devices based on user information in a service plan.

As mentioned, the user 120 can be associated with a variety of device types. In some examples, the UE 110 can represent any device that can wirelessly connect to the telecommunication network, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device. An example architecture for the UE 110 is illustrated in greater detail in FIG. 5.

In some examples, the message(s) 108 can include a communication from the UE 110 requesting to establish a connection to the core network(s) 104, change to an eSIM (e.g., activating the eSIM, assigning the eSIM to another subscriber, etc.), or generally inquire about a service plan. The message(s) 108 can also or instead include a communication from the billing system 106 indicating, for example, a connection permission or connection credential for the UE 110 to establish a communication channel over the core network(s) 104. In various examples, the message(s) 108 can be sent without explicit user input indicating to send the message such as after turning on a device or after a user interacts with the device (e.g., uses a fingerprint to unlock the device). In such examples, the message 108 can be configured for sending to expedite (reduce a number of data exchanges over the core network(s)) that may otherwise be required to establish a service plan or connect an un-activated device.

In some examples, the service plan component 126 can determine a permission status for one or more of the devices associated with the user to connect to the core network(s) 104 based at least in part on validating that a threshold number of devices associated with a service plan has not been exceeded. For instance, a device associated with the user 120 can receive user information representing a fingerprint, iris information, user credentials, a number of devices the user 120 may use to access a network in the future, etc., and associate the user information with a service plan, or other user information from the user 120 usable for the service plan component 126 to associate with a service plan. The device can, for instance, receive the user information in relation to an onboarding operation associated with a first device (e.g., the UE 110) and transmit the user information to the service plan component 126 as part of a first message.

In some examples, the service plan component 126 can, based at least in part on receiving the first message, compare at least some of the user information from the UE 110 to corresponding data in the service plan to authenticate, validate, verify, authorize, or otherwise determine an identity of the user. For instance, the service plan component 126 can compare (e.g., identify similarities and/or differences) biometric data (or other user data) provided by the user 120 and associated in a service plan with subsequently received biometric data from one of the multiple devices (e.g., the user 120 attempts to onboard a new UE). Based at least in part on the comparison identifying that the data is substantially similar, the service plan component 126 can output an indication that the user 120 has been authenticated, validated, etc., which can initiate the service plan component 126 identifying a threshold number of devices associated with the service plan. For example, a previous user input to a device can specify a number of devices to associate with a service plan, and the service plan component 126 can generate a threshold number of devices based at least in part on the number of devices specified by the user 120, and associate the threshold number of devices with the user information, billing rate, and so on, as service plan data.

The service plan component 126 can, for example, determine that connecting the second device to the core network (s) is below the threshold number of devices associated with the service plan. For example, the service plan component 126 can identify a current number of devices that are activated for using the telecommunications network, and determining whether adding the second device exceeds the threshold number of devices. If the service plan component 126 determines that adding the second device does exceeds the threshold number of devices, then the service plan component 126 can send another message 108 to the second device indicating that the service plan limit for allowable devices is reached along with options to add the second device to the same service plan or a new one. If the service plan component 126 determines that adding the second device does not exceed the threshold number of devices, then the service plan component 126 can determine a subscription identifier (also referred to as a device subscription identifier) uniquely identifying the second device in the service plan. Generally, the subscription identifier associates the second device with the service plan and enables the billing system 106 to monitor future data exchanges by the second device. In various examples, responsive to generating the subscription identifier the service plan component 126 can update the current number of devices that are activated for using the telecommunications network in accordance with the service plan.

In some examples, the subscription identifier can be assigned or associated with a service plan based on a user input confirming to add the second device to the service plan while in other examples the second device can be added to the service plan without further user input based at least in part on a previous authorization by the user to add devices to the service plan based on user identity. In some examples, the user can "pre-authorize" a new billing rate for a new number of devices (e.g., another five device connections) in examples when adding the second device to the service plan would otherwise exceed the threshold number of devices. In this way, the user 120 can use a variety of devices to connect to the telecommunications network using a single service plan having a single billing rate.

In some examples, the service plan component 126 can determine a billing rate for a service plan for multiple devices associated with a user agnostic of a device identifier of each of the multiple devices. The billing rate can be determined, for instance, free of relying on identifying characteristics of all the multiple devices by associating the user with up to a threshold number of devices. In various examples, the billing rate can be based at least in part on the threshold number of devices independent of storing device information (e.g., a device type, a device identifier uniquely identifying the device, etc.) about each device in the service plan ahead of at least one of the devices requesting access to the core network(s) 104. The techniques described herein enable a device that is not explicitly identified in the service plan to receive the connection credential output by the activation component 128 for communicating with the UE 124 over the core network(s) 104 without changing the billing rate.

FIG. 2 depicts an example system architecture for a fifth generation (5G) telecommunication network. In some examples, the telecommunication network can comprise the core network(s) 104 in FIG. 1 that includes a service-based system architecture in which different types of network functions (NFs) 202 operate alone and/or together to implement services. Standards for 5G communications define many types of NFs 202 that can be present in 5G telecommunication networks (e.g., the core network 104), including an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP Inter-Working Function (N3IWF), Trusted Non-3GPP Gateway Function (TNGF), and Wireline Access Gateway Function (W-AGF), many of which are shown in the example system architecture of FIG. 2.

One or more of the NFs 202 of the core network(s) 104 can be implemented as network applications that execute within containers (not shown). 5G NFs 202 can execute as hardware elements, software elements, and/or combinations of the two within telecommunication network(s), and accordingly many types of 5G NFs 202 can be implemented as software and/or as virtualized functions that execute on cloud servers or other computing devices. Network applications that can execute within containers can also include any other type of network function, application, entity, module, element, or node.

Figure 3:
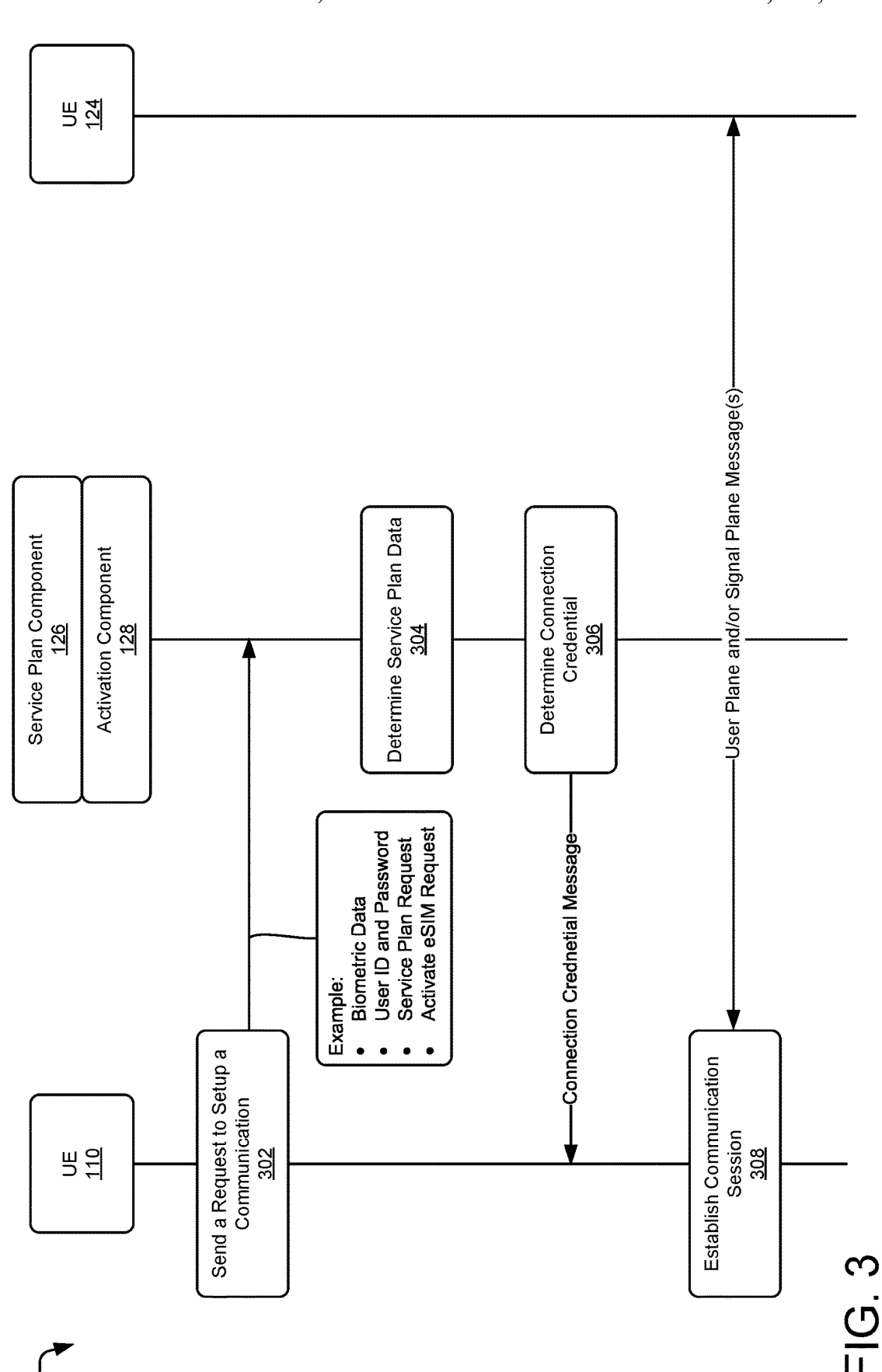
FIG. 3 depicts a messaging flow during an example communication setup through an example billing system.

FIG. 3 depicts a messaging flow during an example communication setup through an example billing system. In some examples, the messaging flow as shown in FIG. 3 can represent activity to determine service plan data by the billing system 106 (e.g., the service plan component 126 and the activation component 128) for establishing a communication channel (e.g., an exchange of data) between the UE 110 of FIG. 1 and the UE 124. For example, the UE 110 can initiate a voice call, text message, or other communication intended for the UE 124, and the billing system 106 can generate connection data representing a credential for the UE 110 to establish a communication channel with the UE 124. In some examples, the message flow can include messaging associated with an IMS (or other component or system of the telecommunications system 102), such as a Session Initiation Protocol (SIP) messaging flow, while in other examples the message flow can represent a messaging flow that does not include communications with an IMS.

The messaging flow as shown in FIG. 3 can include, at 302, the UE 110 sending a request to setup a communication to the service plan component 126 and/or the activation component 128. In some examples, an IMS or other initial point of contact for the telecommunications system 102 can intermediately receive the data sent from the UE 110 and forward the data based at least in part on identifying that the data includes biometric data and/or a user identifier and password. In various examples, the request can be associated with a request to establish a new service plan, a request to modify an existing service plan, a request to place a voice, text, and/or video communication with another UE, or a request to activate an eSIM, just to name a few. In some examples, the request is made based at least in part on user input while in other examples the UE 110 can initiate sending the request based at least in part on other criteria, such as in response to receiving biometric information at the UE 110. For example, the UE 110 can prompt a user to enter biometric information in response to a position of the UE 110 such as when the UE 110 is within a threshold distance of a boundary associated with a network element, a geofence, or the like.

In various examples, the operation at 302 can include the UE 110 sending a communication setup request to a component of the telecommunications system 102 which parses the request and sends at least a portion of the request (e.g., the user information) to the service plan component 126 for comparing with information in a database storing service plan data associated with different service plans. In one non-limiting example, at 302 the UE 110 can send a request to setup a voice call over a 5G core network to an IMS of a 5G system (e.g., a Session Initiation Protocol (SIP) INVITE message or other message requesting a communication channel from the IMS), and the IMS can extract the user information from the communication setup request for validating service plan data associated with a user of the UE 110.

At 304 the billing system 106 can determine service plan data based at least in part on receiving the request from the UE 110. In some examples, determining the service plan data can include generating a service plan, accessing a service plan, and/or analyzing information in an existing service plan. For example, the service plan component 126 can generate a new service plan for a user (e.g., initiate configuring an eSIM, establish connection for a new device, etc.) in examples when the UE 110 is not already associated with a service plan based on a search for the user information in a database of service plans, for example. In some examples, determining the service plan can be based at least in part on the user requesting a new or modified service plan. The service plan component 126 can, for instance, access the service plan from storage (e.g., by matching the user information to information associated with the service plan) for determining whether to add the UE 110 to an existing service plan. For example, the user can access a network and establish the service plan using a first device, and add a second device to the service plan based at least in part on the first device establishing the service plan at a previous time.

At 306 the billing system 106 can determine a connection credential representing a connection permission for the UE 110 to establish a communication channel over the core network(s) 104. For example, the activation component 128 can receive data from the service plan component 126 indicating that the UE 110 can be added to the service plan without exceeding the threshold number of devices associated with the service plan.

At 308 the billing system 106 can cause the UE 110 to establish a communication session based at least in part on the connection credential message sent from the activation component 128. For example, the UE 110 can exchange one or more messages with a network element (e.g., a cell, an antennae, a transceiver, a base station, etc.) of the core network(s) 104 serving the UE 110 to determine a channel of the network element for use as the communication session.

In some examples, the operation 308 can include the UE 110 exchanging message(s) with an IMS of a 5G system (or a component thereof) to establish a user plane and/or a signal plane usable as part of the communication session. In some examples, establishing the communication session at 308 can include determining a unique conduit or channel for exchanging data with the UE 124. In various examples, establishing the communication session can include exchanging a message associated with a Modified Bearer Request (MBR), a Dedicated Bearer, or a Create Bearer Request (CBR). Establishing the communication session at 308 can also or instead include setting up a QC-1 user plane by an SMF. In such examples, the SMF can initiate setting up the QC-1 user plane based at least in part on the SMF receiving a message from the billing system 106 indicating that adding the UE 110 is within the threshold number of devices associated with the service plan of the user.

While FIG. 3 shows message data exchanging between the service plan component 126, the activation component 128, the UE 110, and the UE 124 using the core network(s) 104, it is understood that the message data can also or instead be exchanged between another component of the telecommunications system 102 (e.g., an IMS, a base station or other network element, etc.). Further, though the service plan component 126 and the activation component 128 are illustrated in FIG. 3 individually, it is understood that the service plan component 126 and the activation component 128 (or functionality provided therefrom) may be directly coupled to and/or integrated into an IMS of the telecommunications system (e.g., a 5G system) or other single computing entity. In one specific example, the service plan determination techniques described herein can be implemented as logic (e.g., programmable code) stored in a memory associated FIG. 4A is a first part of a flowchart depicting an example process 400 for determining service plan information by an example billing system usable to connect a device to an example network. Some or all of the process 400 may be performed by one or more components in FIGS. 1-3 and 5, as described herein. For example, some or all of process 400 may be performed by the billing system 106 associated with the telecommunication system 102.

At operation 402, the process may include receiving, by the service plan component, a first communication from a first device at a first time, the first communication including first biometric data or first user credentials associated with a user of the first device. In some examples, the operation 402 may include the billing system 106 receiving a communication (e.g., the message(s) 108) from the UE 110 associated with the user 120) comprising biometric data or user credentials associated with the user. The first communication can represent a request to update a service plan, setup a call with another device, activate an eSIM, update a user profile, verify credit, etc. By way of example and not limitation, the UE 112 can send a request to the telecommunications provider to change assignment of an eSIM. In such examples, the billing system 106 can access an existing service plan or generate a new service plan for associating with the eSIM of the device.

In some examples, the operation 402 can the UE 110 sending the communication independent of receiving a user input other than the entry of the data by the user. In other words, the user can interact with the UE 110 causing the first biometric data and the first user credentials to be stored in a memory of the UE 110 for sending at a later time including periodically. In various examples, the billing system 106 can cause a user interface to present data on a display device of one of the aforementioned devices to present service options and receive an input from the user. In various examples, the billing system 106 can receive the communication via an application based at least in part on using an API determined by a component of the telecommunications provider.

At operation 404, the process may include determining, by the service plan component and based at least in part on the first communication, a service plan for the user to access the telecommunications network using the first device or a second device different from the first device, the service plan not including a device identifier for the second device. In some examples, the operation 404 may include the service plan component 126 retrieving, identifying, or accessing a service plan having previously received user information (e.g., reference biometric data, reference user credentials, etc.). The service plan need not include a device identifier for another device usable by the sure to connect to the network as part of the service plan data associated with the service plan. In some examples, the service plan includes a billing rate that is determined agnostic of the device identifier of the second device. In some examples, the first device or the second device can represent a user equipment, a computing device, an IoT device, a UAV, a vehicle, a sensor, or other device that is capable of wirelessly connecting to a telecommunications network.

At operation 406, the process may include storing, by the service plan component, one or more values to represent the service plan in a memory or database. In some examples, the operation 406 may include the service plan component 126 determining data for storage including data associated with a billing rate, a subscriber identifier associated with the user, a plan identifier identifying the service plan relative to other service plans, device information, a unique identifier of the eSIM, just to name a few. In one non-limiting example, a database can store data associated with a user profile, device identifier (of an activated device, for example), an eSIM identifier, a subscriber identifier, subscription information, and the like.

At operation 408, the process may include receiving, by the service plan component and from the second device at a second time after the first time, a second communication requesting access to the telecommunications network, the second communication including second biometric data or second user credentials associated with the user of the second device. In some examples, the operation 408 may include the service plan component 126 receiving the second biometric data or the second user credentials as part of a call setup request and/or a request to activate a device using an existing service plan. In some examples, the second communication is received after the service plan is determined using the first device including having determined the billing rate for the service plan.

FIG. 4B is a second part of the flowchart depicting the example process 400 for determining service plan information by an example billing system usable to connect a device to an example network.

At operation 410, the process may include accessing, by the service plan component and based at least in part on the second communication, the service plan from the memory or the database. In some examples, the operation 410 may include the service plan component 126 receiving at least a portion of the data included in the second communication and querying a database or other storage device for a service plan associated with the second biometric data or second user credentials.

At operation 412, the process may include determining, by the activation component and based at least in part on the service plan not including the device identifier for the second device, a device credential for the second device to establish a communication channel using the telecommunications network. In some examples, the operation 412 may include the activation component 128 determining a connection credential for the second device to establish a communication channel over the core network(s) 104 with a network element of the telecommunication network and/or another device. In various examples, the device credential can initiate activation of an eSIM (associate the user with the eSIM).

At operation 414, the process may include transmitting, by the activation component, the device credential to the second device to establish the communication channel. In some examples, the operation 414 may include the activation component 128 transmitting data representing a subscription permission (e.g., indicative of whether a device subscription identifier has been added for the device to the service plan) to the second device. The second device can send one or more message(s) to network elements as required to establish a user plane and/or a control plan for the second device to communicate with another device. In various examples, the communication channel can be established after configuring an eSIM to enable the second device to use one or more services from the telecommunication system such as accessing an application or completing a call or text.

In various examples, process 400 may return to operation 402 or operation 408 after performing operation 414. FIGS. 4A and 4B illustrate example processes in accordance with examples of the disclosure. These processes are illustrated as logical flow graphs, each operation of which represents a sequence of operations that can be implemented in hardware, software, or a combination thereof. The order in which the operations are described is not intended to be construed as a limitation, and any number of the described operations can be omitted and/or combined in any order and/or in parallel to implement the processes.

Figure 5:
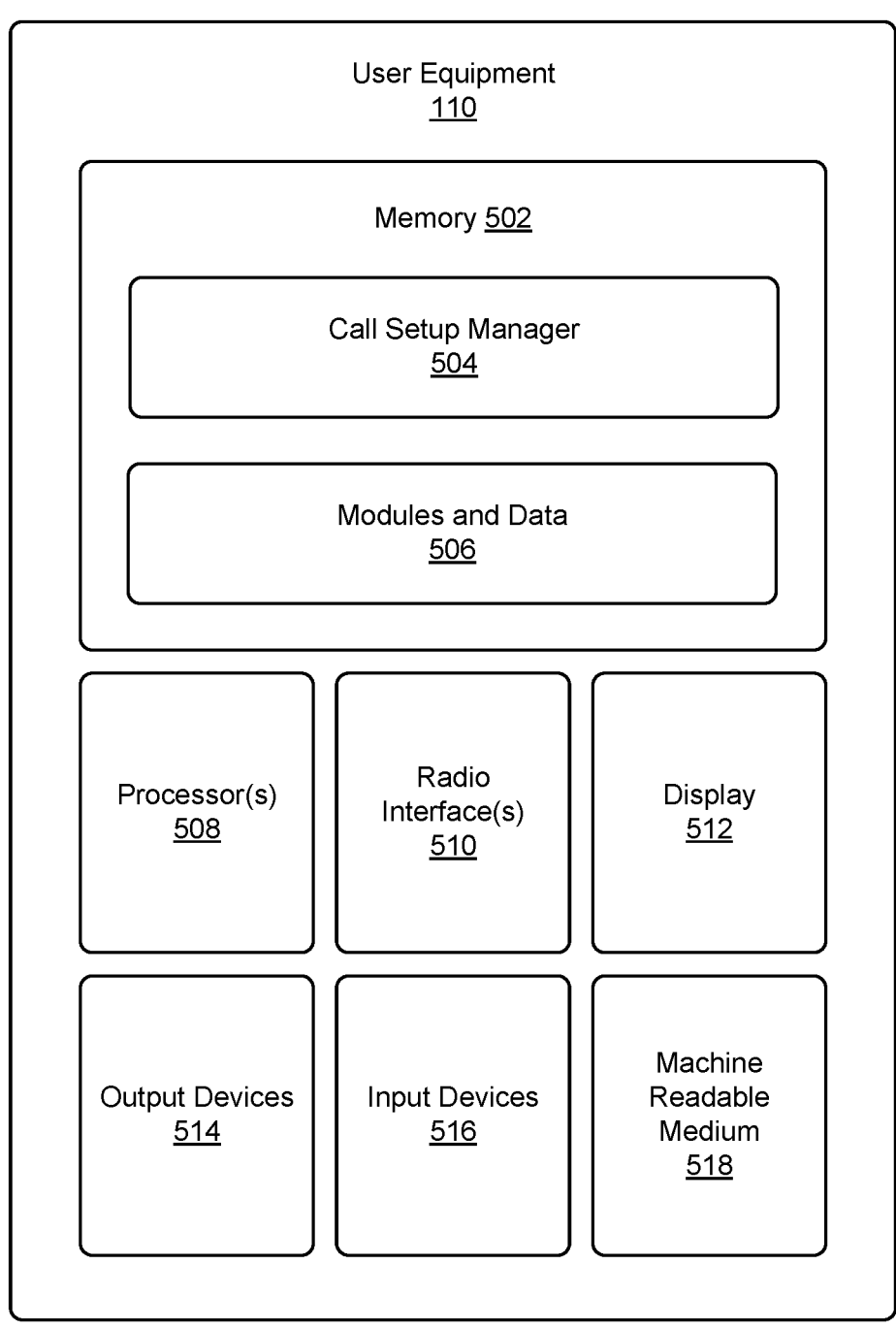
FIG. 5 depicts an example system architecture for a user equipment.

FIG. 5 depicts an example system architecture for a UE 112, in accordance with various examples. As shown, a UE 112 can have memory 502 storing a call setup manager 504, and other modules and data 506. A UE 112 can also comprise processor(s) 508, radio interfaces 510, a display 512, output devices 514, input devices 516, and/or a machine readable medium 518.

In various examples, the memory 502 can include system memory, which may be volatile (such as RAM), non-volatile (such as ROM, flash memory, etc.) or some combination of the two. The memory 502 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 110. Any such non-transitory computer-readable media may be part of the UE 110.

The call setup manager 504 can send and/or receive messages including determining a communication interface for communicating with the billing system 106. The call setup manager 504 can configure SIP messages or other forms of communication comprising one or more of: a transmission control protocol (TCP), an internet protocol (IP), a user datagram protocol (UDP), a simple mail transport protocol (SMTP), a file transfer protocol (FTP), a hypertext transfer protocol (HTTP), or a hypertext transfer protocol secure (HTTPS).

The other modules and data 506 can be utilized by the UE 110 to perform or enable performing any action taken by the UE 110. The modules and data 506 can include a UE platform, operating system, and applications, and data utilized by the platform, operating system, and applications.

In various examples, the processor(s) 508 can be a central processing unit (CPU), a graphics processing unit (GPU), a tensor processing unit (TPU), or a combination thereof, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing all computer applications stored in the memory 502, which can be associated with common types of volatile (RAM) and/or nonvolatile (ROM) memory.

The radio interfaces 510 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 510 can be compatible with multiple radio access technologies, such as 5G radio access technologies and 4G/LTE radio access technologies. Accordingly, the radio interfaces 510 can allow the UE 110 to connect to the telecommunication system 102 and/or the mobile network operator 302 described herein.

The display 512 can be a liquid crystal display or any other type of display commonly used in UEs 110. For example, display 512 may be a touch-sensitive display screen, and can then also act as an input device or keypad, such as for providing a soft-key keyboard, navigation buttons, or any other type of input. The output devices 514 can include any sort of output devices known in the art, such as the display 512, speakers, a vibrating mechanism, and/or a tactile feedback mechanism. Output devices 514 can also include ports for one or more peripheral devices, such as headphones, peripheral speakers, and/or a peripheral display. The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 518 can store one or more sets of instructions, such as software or firmware, that embodies any one or more of the methodologies or functions described herein. The instructions can also reside, completely or at least partially, within the memory 502, processor(s) 508, and/or radio interface(s) 510 during execution thereof by the UE 112. The memory 502 and the processor(s) 508 also can constitute machine readable media 518.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system implemented by a telecommunication network provider, the system comprising:

one or more processors; and one or more non-transitory computer-readable media storing instructions executable by the one or more processors, wherein the instructions, when executed, cause the system to perform operations comprising:

managing identity information associated with a user of a telecommunications network and service plan information representing an agreement between the user and the telecommunication network provider for the user to connect multiple devices to the telecommunications network, receiving a first communication from a first device at a first time, the first communication including first biometric data or first user credentials associated with a user of the first device, determining, based at least in part on the first communication, a service plan for the user to access the telecommunications network using the first device or a second device different from the first device, the service plan not including a device identifier for the second device, wherein determining the service plan for the user to access the telecommunications network using the first device or the second device comprises determining a billing rate based at least in part on a previous user input indicating a threshold number of devices to associate with the service plan and independent of receiving a device identifier for each device associated with the threshold number of devices;

storing one or more values to represent the service plan in a memory or database;

receiving, from the second device at a second time after the first time, a second communication requesting access to the telecommunications network, the second communication including second biometric data or second user credentials associated with the user of the second device;

accessing, based at least in part on the second communication, the service plan from the memory or the database;

determining, based at least in part on the service plan not including the device identifier for the second device, a device credential for the second device to establish a communication channel using the telecommunications network; and transmitting the device credential to the second device to establish the communication channel.

2. The system of claim 1, the operations further comprising:

authenticating an identity of the user based at least in part on comparing the second biometric data or the second user credentials to the first biometric data or the first user credentials, wherein accessing the service plan from the memory or the database is based at least in part on authenticating the identity of the user.

3. The system of claim 1, the operations further comprising:

authenticating an identity of the user based at least in part on comparing the second biometric data or the second user credentials to the first biometric data or the first user credentials; and initiating, based at least in part on the authenticating, activation of an embedded Subscriber Identity Module (eSIM) of the second device, wherein determining the device credential is further based at least in part on the activation of the eSIM of the second device.

4. The system of claim 1, wherein determining the device credential comprises:

determining a subscription identifier to bill a service provided to the second device using the telecommunications network; and associating the subscription identifier and the second device in the service plan.

5. The system of claim 1, wherein:

determining the service plan for the user to access the telecommunications network using the first device or the second device comprises determining the billing rate independent of identifying a device type, and determining the device credential for the second device is further based at least in part on the billing rate.

6. The system of claim 1, the operations further comprising:

determining the threshold number of devices to include in the service plan for connecting to the telecommunications network; and determining to add device information of the second device in the service plan based at least in part on adding the second device to the service plan is below the threshold number of devices, wherein determining the device credential is further based at least in part on determining that connecting the second device to the telecommunications network is below the threshold number of devices.

7. The system of claim 1, wherein:

the device credential enables the second device to exchange data with a third device using the communication channel.

8. The system of claim 1, further comprising a user interface configured to present information associated with the service plan, and the operations further comprising:

causing, by the service, the user interface to present data associated with one or more of: a modification to the service plan, a payment status, an eSIM activation, or an order status; and outputting, by the user interface, one or more controls to update the data.

9. The system of claim 1, wherein:

the telecommunications network comprises a fifth generation telecommunications network, and the first device or the second device comprises a user equipment, a computing device, an Internet of Things device, a watch device, a meter, a listening device, a video camera device, a vehicle, a drone, a bicycle, a sensor, or a Machine to Machine device.

10. A method comprising:

receiving, by a server of a telecommunications network, a first communication from a first device, the first communication including first biometric data or first user credentials associated with a user of the first device, determining, by the server and based at least in part on the first communication, a service plan for the user to access the telecommunications network using the first device or a second device different from the first device, the service plan independent of a device identifier of the second device;

storing one or more values to represent the service plan in a memory or database;

receiving, by the server and from the second device, a second communication requesting access to the telecommunications network, the second communication including second biometric data or second user credentials associated with the user of the second device;

accessing, by the server and based at least in part on the second communication, the service plan from the memory or the database;

determining, by the server and based at least in part on the service plan not including the device identifier for the second device, a device credential for the second device to establish a communication channel using the telecommunications network;

transmitting, by the server, the device credential to the second device to cause the second device to connect to the telecommunications network using the communication channel;

determining, by the server, a threshold number of devices to include in the service plan for connecting to the telecommunications network; and determining, by the server, to add device information of the second device in the service plan based at least in part on adding the second device to the service plan is below the threshold number of devices, wherein determining the device credential is further based at least in part on determining that connecting the second device to the telecommunications network is below the threshold number of devices.

11. The method of claim 10, further comprising:

authenticating, by the server, an identity of the user based at least in part on comparing the second biometric data or the second user credentials to the first biometric data or the first user credentials, wherein accessing the service plan from the memory or the database is based at least in part on authenticating the identity of the user.

12. The method of claim 10, further comprising:

authenticating, by the server, an identity of the user based at least in part on comparing the second biometric data or the second user credentials to the first biometric data or the first user credentials; and initiating, based at least in part on the authenticating, activation of an embedded Subscriber Identity Module (eSIM) of the second device, wherein determining the device credential is further based at least in part on the activation of the eSIM of the second device.

13. The method of claim 10, wherein determining the device credential comprises:

determining a device subscription identifier to bill a service provided to the second device using the telecommunications network; and associating the device subscription identifier and the second device in the service plan.

14. The method of claim 10, further comprising:

determining a billing rate independent of identifying a device type or a device identifier of the second device, wherein determining the device credential for the second device is further based at least in part on the billing rate.

15. One or more non-transitory computer-readable media storing instructions executable by one or more processors, wherein the instructions, when executed, cause the one or more processors to perform operations comprising:

receiving, by a server of a telecommunications network, a first communication from a first device, the first communication including first biometric data or first user credentials associated with a user of the first device, determining, by the server and based at least in part on the first communication, a service plan for the user to access the telecommunications network using the first device or a second device different from the first device, the service plan independent of a device identifier of the second device;

storing one or more values to represent the service plan in a memory or database;

receiving, by the server and from the second device, a second communication requesting access to the telecommunications network, the second communication including second biometric data or second user credentials associated with the user of the second device;

accessing, by the server and based at least in part on the second communication, the service plan from the memory or the database;

determining, by the server and based at least in part on the service plan not including the device identifier for the second device, a device credential for the second device to establish a communication channel using the telecommunications network; and transmitting, by the server, the device credential to the second device to cause the second device to connect to the telecommunications network using the communication channel;

determining, by the server, a threshold number of devices to include in the service plan for connecting to the telecommunications network; and determining, by the server, to add device information of the second device in the service plan based at least in part on adding the second device to the service plan is below the threshold number of devices, wherein determining the device credential is further based at least in part on determining that connecting the second device to the telecommunications network is below the threshold number of devices.

16. The one or more non-transitory computer-readable media of claim 15, the operations further comprising:

authenticating, by the server, an identity of the user based at least in part on comparing the second biometric data or the second user credentials to the first biometric data or the first user credentials, wherein accessing the service plan from the memory or the database is based at least in part on authenticating the identity of the user.

17. The one or more non-transitory computer-readable media of claim 15, the operations further comprising:

authenticating, by the server, an identity of the user based at least in part on comparing the second biometric data or the second user credentials to the first biometric data or the first user credentials; and initiating, based at least in part on the authenticating, activation of an embedded Subscriber Identity Module (eSIM) of the second device, wherein determining the device credential is further based at least in part on the activation of the eSIM of the second device.

18. The one or more non-transitory computer-readable media of claim 15, wherein determining the device credential comprises:

determining a device subscription identifier to bill a service provided to the second device using the telecommunications network; and associating the device subscription identifier and the second device in the service plan.

* * * * *